(12) United States Patent
Nishiura

(10) Patent No.: US 7,314,180 B2
(45) Date of Patent: Jan. 1, 2008

(54) MEMORY CARD AND REPRODUCING APPARATUS

(75) Inventor: Toshifumi Nishiura, Tokyo (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 11/203,453

(22) Filed: Aug. 12, 2005

(65) Prior Publication Data

US 2006/0041709 A1  Feb. 23, 2006

(30) Foreign Application Priority Data

Aug. 23, 2004  (JP) ............................ P2004-242606

(51) Int. Cl.
*G06K 19/06* (2006.01)

(52) U.S. Cl. .................... 235/492; 235/487; 711/115; 711/170

(58) Field of Classification Search ................ 235/375, 235/380, 492, 451; 711/115, 163, 170

See application file for complete search history.

(56) References Cited

U.S. PATENT DOCUMENTS 5,481,519 A * 1/1996 Hosoya ................... 369/53.21
6,499,084 B2 * 12/2002 Kobayashi et al. ......... 711/115
2003/0033496 A1 * 2/2003 Takagi et al. ............... 711/163
2004/0148454 A1 * 7/2004 Seo ............................ 711/100
2005/0005149 A1 * 1/2005 Hirota et al. ............... 713/193

* cited by examiner

*Primary Examiner*—Thien M. Le
*Assistant Examiner*—Edwyn Labaze
(74) *Attorney, Agent, or Firm*—Robert J. Depke; Rockey, Depke & Lyons, LLC.

(57) ABSTRACT

Data with high confidentiality is stored safely in a memory card while maintaining the function of a FAT file system that an existing memory card has. In a data area 30 of a semiconductor memory 42, the FAT file system management areas 33 to 36, a dedicated data area 31 that stores data of a dedicated file system different from the FAT file system and a dedicated file system management area 32 that indicates an access method to the dedicated data area 31 are provided; and the data reproduced based on information within the FAT file system management areas 33 to 36 is made to be the data different from the data reproduced from the dedicated data area 31 based on the information within the dedicated file system management area 32.

6 Claims, 7 Drawing Sheets

MEMORY CARD AND REPRODUCING APPARATUS

CROSS REFERENCES TO RELATED APPLICATIONS

The present invention contains subject matter related to Japanese Patent Application JP 2004-242606 filed in the Japanese Patent Office on Aug. 23, 2004, the entire contents of which being incorporated herein by reference.

BACKGROUND OF THE INVENTION

1. Field of the Invention

The present invention relates to a memory card that stores data with high confidentiality and a dedicated reproducing apparatus that reproduces data from the memory card.

2. Description of the Related Art

The memory stick™ and others are widely used as a memory card which is an external storage device using a semiconductor memory. In such memory card, typically a FAT (File Allocation Tables) file system is employed to manage data (refer to Patent Document 1, for example). It is the one that aims to easily handle data stored in a memory card by using a system in general in which the OS such as Windows® or the like is installed.

Patent Document 1: Japanese Patent Publication No. 2002-373314, paragraph 0020, FIG. 4)

SUMMARY OF THE INVENTION

However, on the other hand in such a memory card, since data can be reproduced easily, data leakage and an illegal copy of the data easily occur, even in the case where the data with high confidentiality (for example, exam questions and personal information or the like) is stored. Accordingly, the existing memory card is not suitable for storing the data with high confidentiality.

In light of the above, the present invention provides a memory card that stores data with high confidentiality, while maintaining the FAT file system function that the existing memory card has.

A memory card according to an embodiment of the present invention has in a data area of a semiconductor memory: a FAT file system management area; a dedicated data area that stores data of a dedicated file system different from the FAT file system; and a dedicated file system management area that indicates an access method to the dedicated data area, wherein data reproduced based on information within the FAT file system management area is the data different from data reproduced from the dedicated data area based on information within the dedicated file system management area.

This memory card has in the data area of the semiconductor memory the dedicated data area that stores data of the dedicated file system different from the FAT file system, and has the dedicated file system management area that indicates the access method to this dedicated data area.

Therefore, data can be reproduced from the dedicated data area by the dedicated file system with the procedures such as: "access to the dedicated file system management area" and then "access to the dedicated data area by means of the access method indicated by the management area".

On the other hand, because there is the FAT file system management area in the data area, data can also be reproduced by the FAT file system. However, the data reproduced based on the information within the FAT file system management area is different from the data reproduced from the dedicated data area based on the information within the dedicated file system management area. Accordingly, even if data is reproduced from this memory card by using a system in general in which the OS such as Windows® or the like is installed, the original data may not be leaked because it is recognized as the data different from the original data.

In this way, according to this memory card, data can be stored into the existing memory card that uses the FAT file system, with a data format only reproducible by a dedicated file system which is not compatible with the FAT file system. With this, data with high confidentiality can be stored into the memory card safely while maintaining the function of the FAT file system, which the existing memory card has.

Further, as an example, it is preferable that data reproduced based on the information within the FAT file system management area is the data whose data array is altered from that of the data reproduced from the dedicated data area based on the information within the dedicated file system management area.

As a result, the data reproduced by the FAT file system can be made the data different from the data reproduced by the dedicated file system, without further adding an area where the data is stored, except for the dedicated data area.

Further, as an example in this memory card, it is preferable that a dedicated file area that indicates an access method to the dedicated file system management area is provided in the system area of the semiconductor memory.

With the above, even if the data reproduced from the data area of this memory card is illegally copied to another memory card by the FAT file system and the copy is tried to be reproduced from another memory card by the dedicated file system, the dedicated file system management area cannot be accessed because the dedicated file area is not included; consequently, reproduction with accessing the dedicated data area cannot be performed. Therefore, data with high confidentiality can be stored more safely because the illegal copy of this memory card can be prevented.

Next, a reproducing apparatus according to an embodiment of the present invention is a reproducing apparatus which reproduces data from a memory card having in a data area of a semiconductor memory a FAT file system management area, a dedicated data area that stores data of a dedicated file system different from the FAT file system, and a dedicated file system management area that indicates an access method to the dedicated data area, in which data reproduced based on information within the FAT file system management area is the data different from data reproduced from said dedicated data area based on information within said dedicated file system management area; the reproducing apparatus includes: processing means that perform first processing of accessing the dedicated file system management area within the data area and second processing of accessing the dedicated data area by the access method indicated by the dedicated file system management area to reproduce the data.

According to this reproducing apparatus, data stored in the above described memory card according to an embodiment of the present invention can be reproduced by the dedicated file system.

Further, in the case that this memory card includes a dedicated file area within the system area of the semiconductor memory, which indicates an access method to the dedicated file system management area, it is preferable that in the first processing, after accessing the dedicated file area within the system area, the dedicated file system management area is accessed by the access method indicated by the dedicated file area.

According to an embodiment of the memory card of the present invention, data can be stored into the existing memory card that uses the FAT file system, with a data format only reproducible by a dedicated file system which is not compatible with the FAT file system. With this, data with high confidentiality can be stored safely into the memory card while maintaining the function of the FAT file system, which the existing memory card has.

Further, data with high confidentiality can be stored more safely because the illegal copy can be prevented by providing the dedicated file area that indicates the access method to the dedicated file system management area.

According to an embodiment of the reproducing apparatus of the present invention, the effectiveness that the data stored into the memory card according to an embodiment of the present invention can be reproduced by the dedicated file system.

BRIEF DESCRIPTION OF THE DRAWINGS

These and other objects and features of the present invention will become clear from the following description of the preferred embodiments given with reference to the accompanying drawings, in which.

DESCRIPTION OF THE PREFERRED EMBODIMENTS

Hereinafter, embodiments of the present invention are specifically explained with reference to the drawings. Note that, in the followings examples are explained, in which the present invention is applied to a memory stick that stores questions for the listening test of a language (voice data in which words and the like are pronounced) and to a dedicated player that reproduces the questions of the examination from this memory stick.

Figure 1:
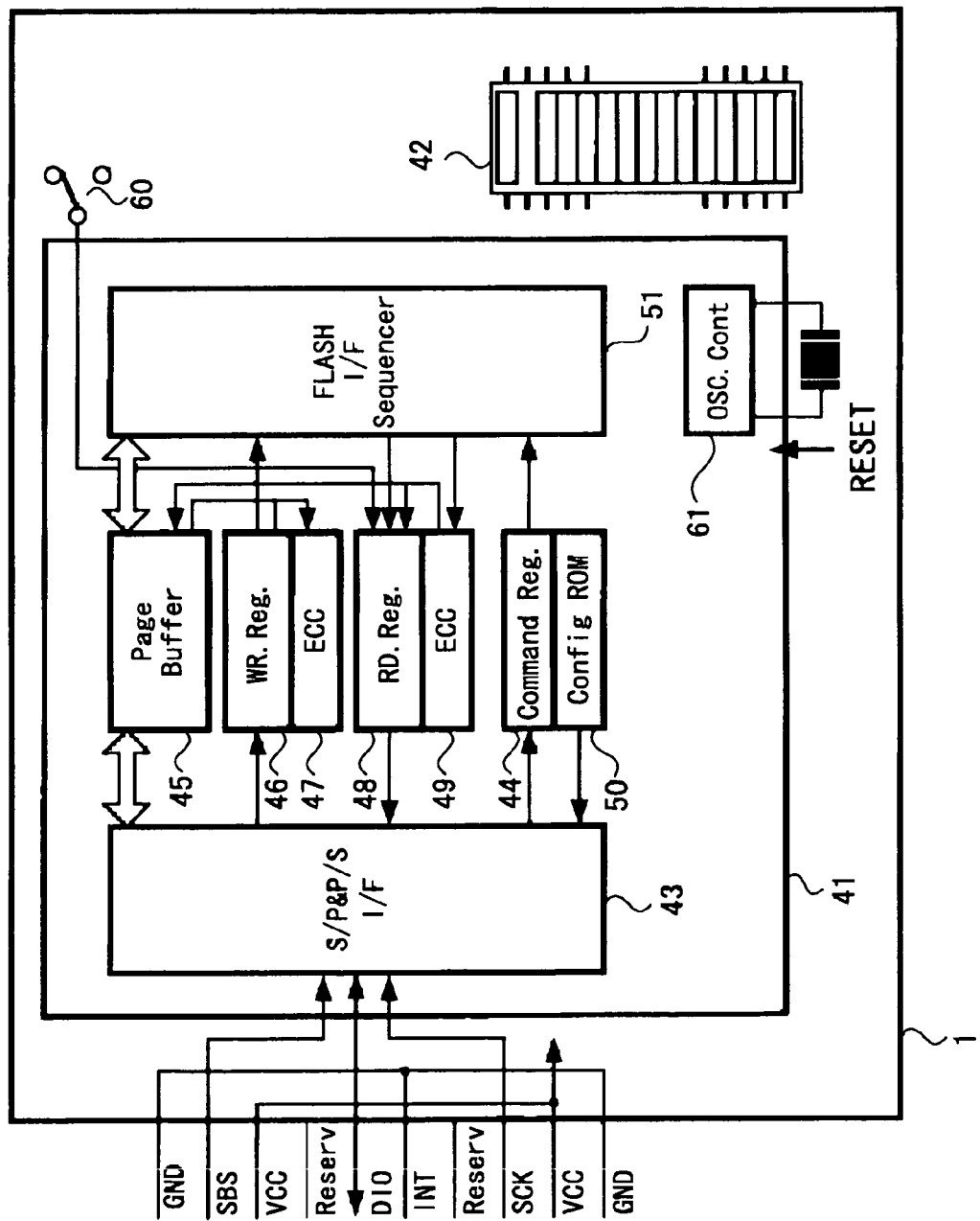
FIG. 1 is a block diagram showing an example of a circuit configuration of a memory stick to which the present invention is applied.

FIG. 1 is a block diagram showing a circuit configuration of the memory stick to which this invention is applied. A memory stick 1 includes a control block 41 and a flash memory 42 as one chip IC. The bidirectional serial interface between the memory stick 1 and the external system is formed with ten wires. Four main wires among the ten wires are a clock wire SCK to transfer the clock when transferring the data, a status wire SBS to transfer the status, a data wire DIO to transfer the data and an interrupt wire INT. Besides, two GND wires and two VCC wires are provided as the power supply wires. Two wires "Reserve" are wires not defined.

The clock line SCK is the wire for transferring the clock synchronized with data. The status wire SBS is the wire for transferring a signal showing the status of a memory card 40. The data wire DIO is the wire for inputting or outputting commands and encrypted audio data. The interrupt wire INT is the wire that transfers an interrupt signal which demands the interrupt from the memory card 40 to a CPU 2 in a decoder 1.

A serial/parallel conversion, parallel/serial conversion and interface block (hereinafter abbreviated to the S/P, P/S and IF block) 43 of the control block 41 is an interface between the external system connected through the above described plurality of wires and the control block 41. The S/P, P/S and IF block 43 converts serial data received from the outside into parallel data, and loads the data into the control block 41, and converts parallel data from the control block 41 into serial data, and sends the data to the outside system.

In the format transferred through the data wire DIO, a command is transferred at first, after that data is transferred. The S/P, P/S and IF block 43 stores the command into a command register 44, and stores the data into a page buffer 45 and a write-register 46. An error correction coding circuit 47 is provided in association with the write-register 46. The error correction encoding circuit 47 generates a redundancy code of an error correction code, with respect to the data temporarily stored in the page buffer 45.

The data output from the command register 44, page buffer 45, write-register 46 and error correction coding circuit 47 are supplied to a flash memory, interface and sequencer (hereinafter abbreviated as the memory, IF and sequencer) 51. The memory, IF and sequencer 51 is the interface between the control block 41 and the flash memory 42, and controls data communication between the both. Data is written into the flash memory 42 through the memory, IF and sequencer 51.

Data read out from the flash memory 42 is supplied to the page buffer 45, a read-register 48 and an error correction circuit 49 through the memory, IF and sequencer 51. Error correction is performed on the data stored in the page buffer 45 by the error correction circuit 49. The error corrected output of the page buffer 45 and the output of the read-register 48 are supplied to the S/P, P/S and IF block 43, and supplied to the outside system through the above described bidirectional serial interface.

Version information of the memory stick 1 and various attribute information are stored in a configuration ROM 50. A switch 60 is the switch for preventing deletion by accident that user can operate according to the necessity, and in the case that this switch 60 is in the connected state of prohibiting deletion, the deletion is prohibited even if a command for deleting data in the flash memory 42 comes from the outside. An oscillator 61 generates the clock that becomes the reference timing of the processing of the memory card 40.

Figure 2:
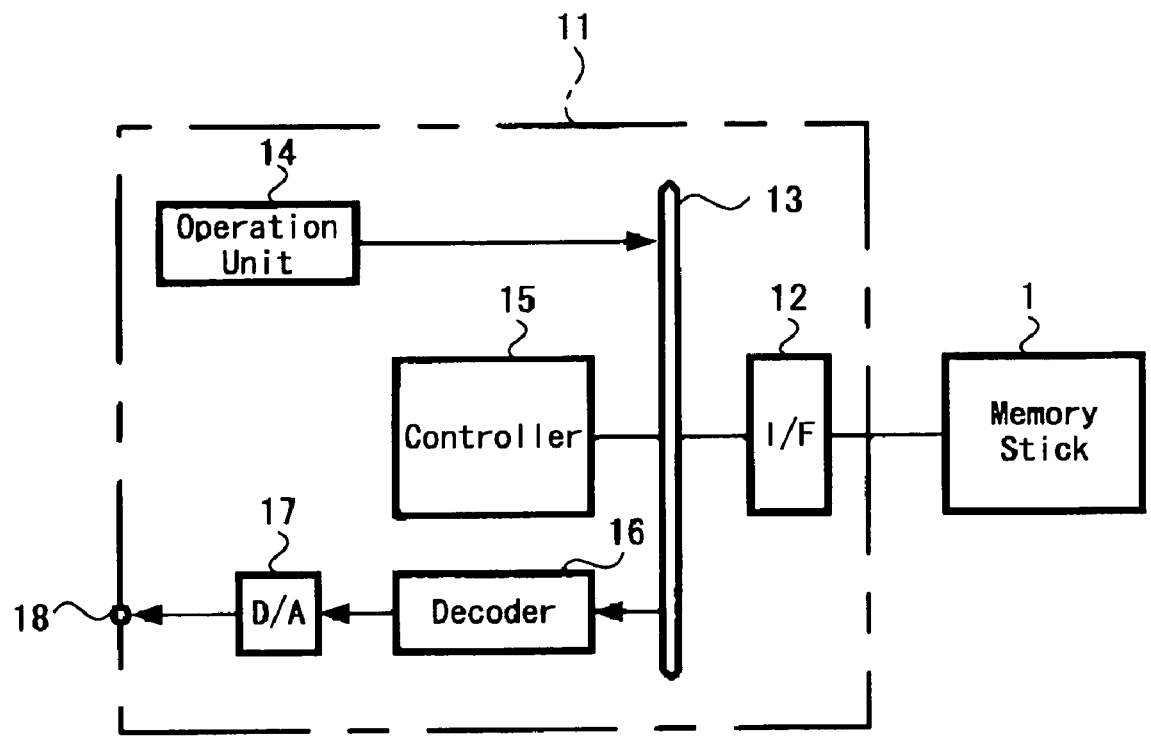
FIG. 2 is a block diagram showing an example of a circuit configuration of a player to which the present invention is applied.

FIG. 2 is a block diagram showing an example of a circuit configuration of a player to which the present invention is applied. A player 11 is a dedicated apparatus in which the memory stick 1 of FIG. 1 is installed in a detachable manner and the questions of the examination are reproduced. The player 11 includes an interface block 12, an operation unit 14, a controller 15 formed of a micro computer, a decoder 16, a D/A converter 17 and an earphone terminal 18. The interface block 12 is the interface with the memory stick 1 connected through the plurality of wires of the above described bidirectional serial interface. The interface 12, operation unit 14, controller 15 and decoder 17 are connected to a bus 13.

The operation unit 14 is provided in the chassis of the player 11 and includes a reproducing button to reproduce the questions of the examination one by one from the memory stick 1. The controller 15 performs processing shown in FIG. 3 described later, by sending a command to the memory stick 1 based on operation of this reproducing button.

Data input from the memory stick 1 to the interface block 12 is sent to the decoder 16 from the interface block 12 through the bus 13. The decoder 16 performs processing of decoding audio data compressed by a compression method such as ATRAC-3 (Adaptive Transform Acoustic Coding 3), for example. The audio data decoded by the decoder 16 is converted into an analogue audio signal by the D/A converter 17, and is output from the earphone terminal 18.

Figure 3:
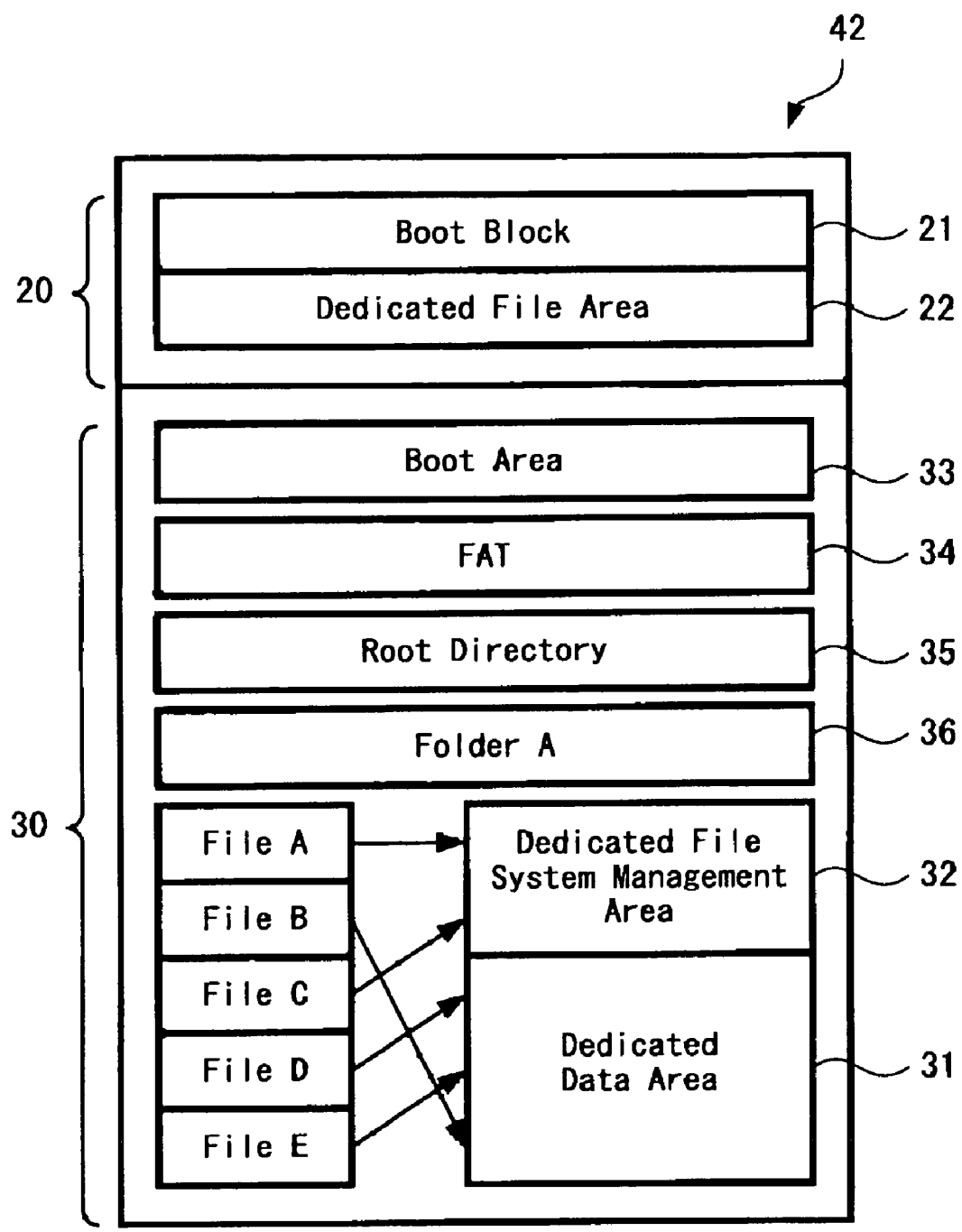
FIG. 3 is a diagram showing the format of a flash memory of the memory stick of FIG. 1.

FIG. 3 shows a physical format of the flash memory 42 of the memory stick 1. An area of the flash memory 42 is divided into a system area 20 and a data area 30. The system area 20 includes a Boot Block 21 that stores information specific to each flash memory 42 and a dedicated file area 22. The dedicated file area 22 is the area different from the Boot Block 21 and can not be accessed by the FAT file system.

Figure 4:
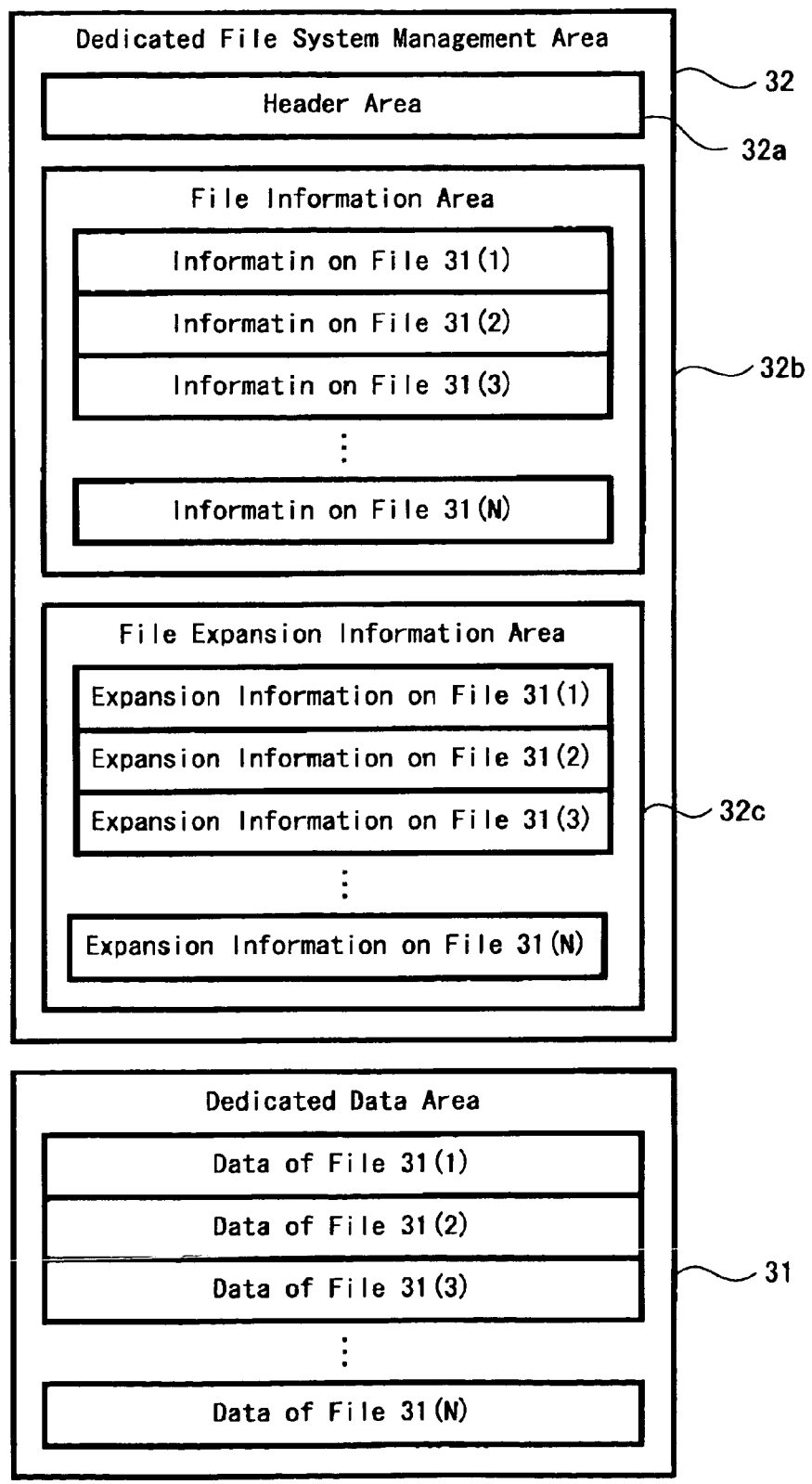
FIG. 4 is a diagram showing in detail a dedicated data area and dedicated file system management area of FIG. 3.

The data area 30 includes a dedicated data area 31 and a dedicated file system management area 32. FIG. 4 shows the details of the dedicated data area 31 and dedicated file system management area 32. N questions of the examination (audio data) are stored in the dedicated data area 31 as data files from 31 (1) to 31 (N), which are compressed by such a compression method as ATRAC-3, for example. Data in each of the files from 31 (1) to 31 (N) is stored in the physically consecutive area (a sector number of which is consecutive) in accordance with the reproducing order of the data. The size of one sector is 512 bytes.

The dedicated file system management area 32 includes a header information area 32a, a file information area 32b and a file expansion information area 32c. The offset of the file information area 32b and the file expansion information area 32c, the version information and the like are stored in the header information area 32a.

Information necessary for the access to the file, such as the data start sector number, file size, file name and the like is stored in the file information area 32b for each of the files 31 (1) to 31 (N) within the dedicated data area 31.

The command for the file (information on operations performed by the player of FIG. 2 with respect to the file) is stored in the file expansion information area 32c for each of the files 31 (1) to 31 (N) within the dedicated data area 31.

In addition, it is also possible to provide, in the dedicated data area 31 and dedicated file system management area 32, an empty file in which only the command for the file is stored in the file expansion information area 32c, and with respect to that file, data is not reproduced and only the command stored in the file expansion information area 32c is executed.

The dedicated file area 22 within the system area 20 of FIG. 3 is the area in which the sector number of the dedicated file system management area 32 is stored as information that indicates an access method to this dedicated file system management area 32. The information on the sector number of this dedicated file area 22 is stored in advance in the memory within the controller 15 of the player 11 in FIG. 2.

The data area 30 includes, as management areas for the FAT file system, a boot area 34, a FAT 34, a root directory 35 and a folder area 36 thereunder (here, only one folder "A" is provided). The above described dedicated data area 31 and dedicated file system management area 32 are assigned to the area of each file within the folder "A" (five files from "A" to "E" are here assumed to be provided).

The start cluster and size information with respect to each of files "A" to "E" are stored in the folder area 36, but these start clusters are positioned appropriately within the dedicated data area 31 or dedicated file system management area 32 regardless of the data array of the files 31 (1) to 31 (N) within the dedicated data area 31, as shown with arrows in the figure. The size of one cluster is 16K bytes.

Further, information on the cluster number of each cluster following the start cluster with respect to each of files "A" to "E" is stored in the FAT 34, but these clusters are also positioned appropriately within the dedicated data area 31 or dedicated file system management area 32 regardless of the data array of the files 31 (1) to 31 (N) within the dedicated data area 31.

Therefore, data read out based on the information within the FAT file system management area is made to be the data in which the arrangement of the data (original audio data on the questions of the examination) within the dedicated data area 31 is changed.

Figure 5:
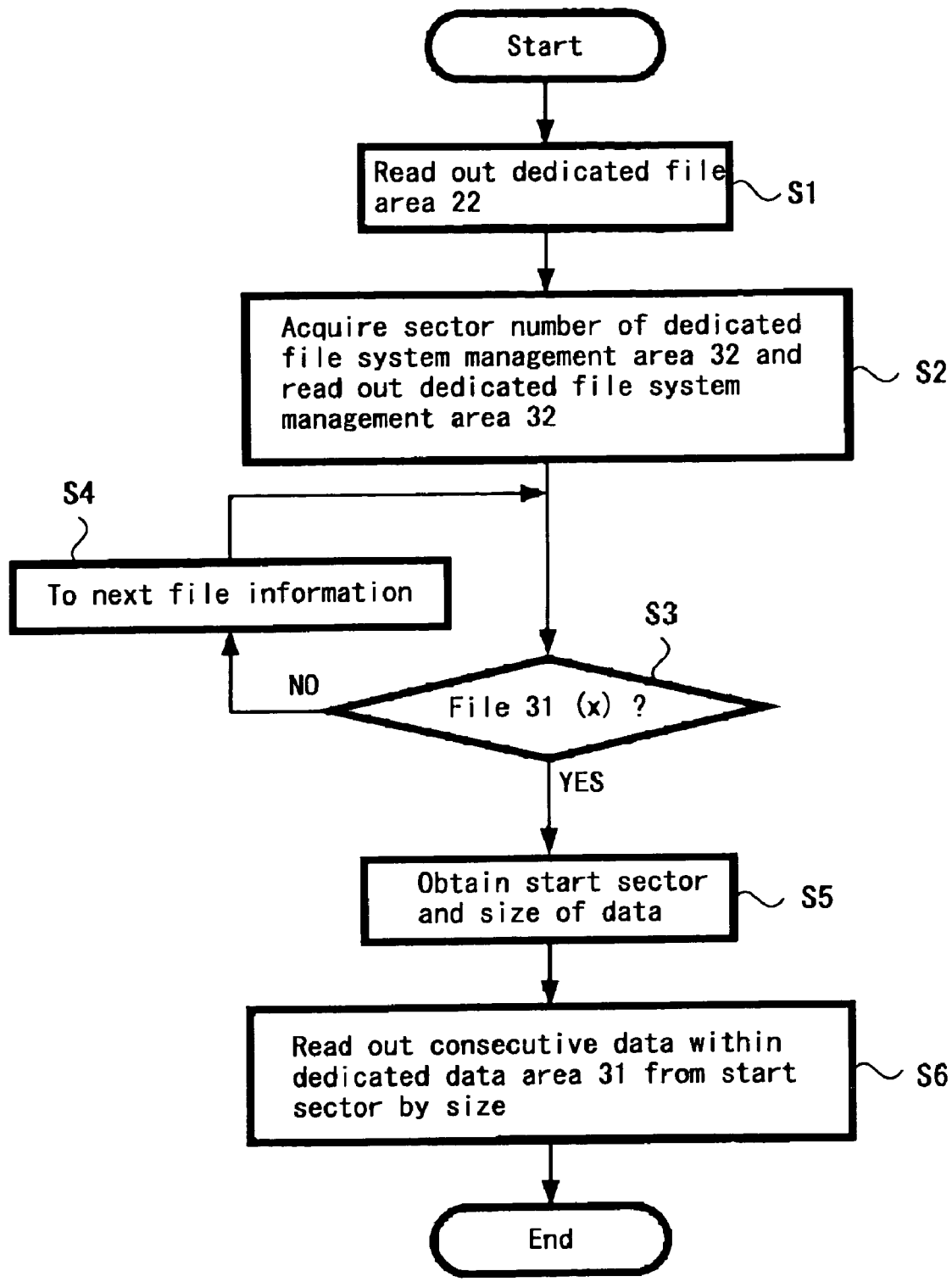
FIG. 5 is a flow chart showing processing executed by a controller of the player of FIG. 2.

FIG. 5 is a flow chart showing the processing performed by the controller 15 of the player 11 in FIG. 2 to control the control block 41 in the memory stick 1 based on the operation of the reproducing button of the operation unit 14. In this processing, at first, the dedicated file area 22 (FIG. 3) within the system area 20 in the flash memory 42 is accessed, and the information within this dedicated file area 22 is read out (step S1).

Then, information on the sector number of the dedicated file system management area 32 (FIG. 3) in the data area 30 is acquired, and based on the information the access to the dedicated file system management area 32 is executed, and information with respect to the first file 31 (1) within the dedicated data area 31 (FIG. 3) is read out (step S2).

Next, it is judged whether or not the information read out is the one with respect to the file 31 (X) (the Xth question of the examination) to be read out this time (step S3). If it is "NO", the judgment of the step S3 is repeated while reading out information with respect to the next file 31 (2), 31 (3) . . . , one by one (step S4).

When it becomes "YES", the start sector and size information with respect to the data of the file 31 (X) to be read out is acquired (step S5), and the data of the file 31 (X) is read out by reading out the consecutive data with only the size from the start sector within the dedicated data area 31 (step S6). Then, the processing ends.

As described above, the data of the file 31 (X) read out from the flash memory 42 is supplied from the memory stick 1 to the player 11, and is output from the earphone terminal 18 of the player 11 as the audio signal. Therefore, examinees of the hearing examination can take a test by using one player 11 respectively and by reproducing the questions of the examination from the memory stick 1.

Figure 6:
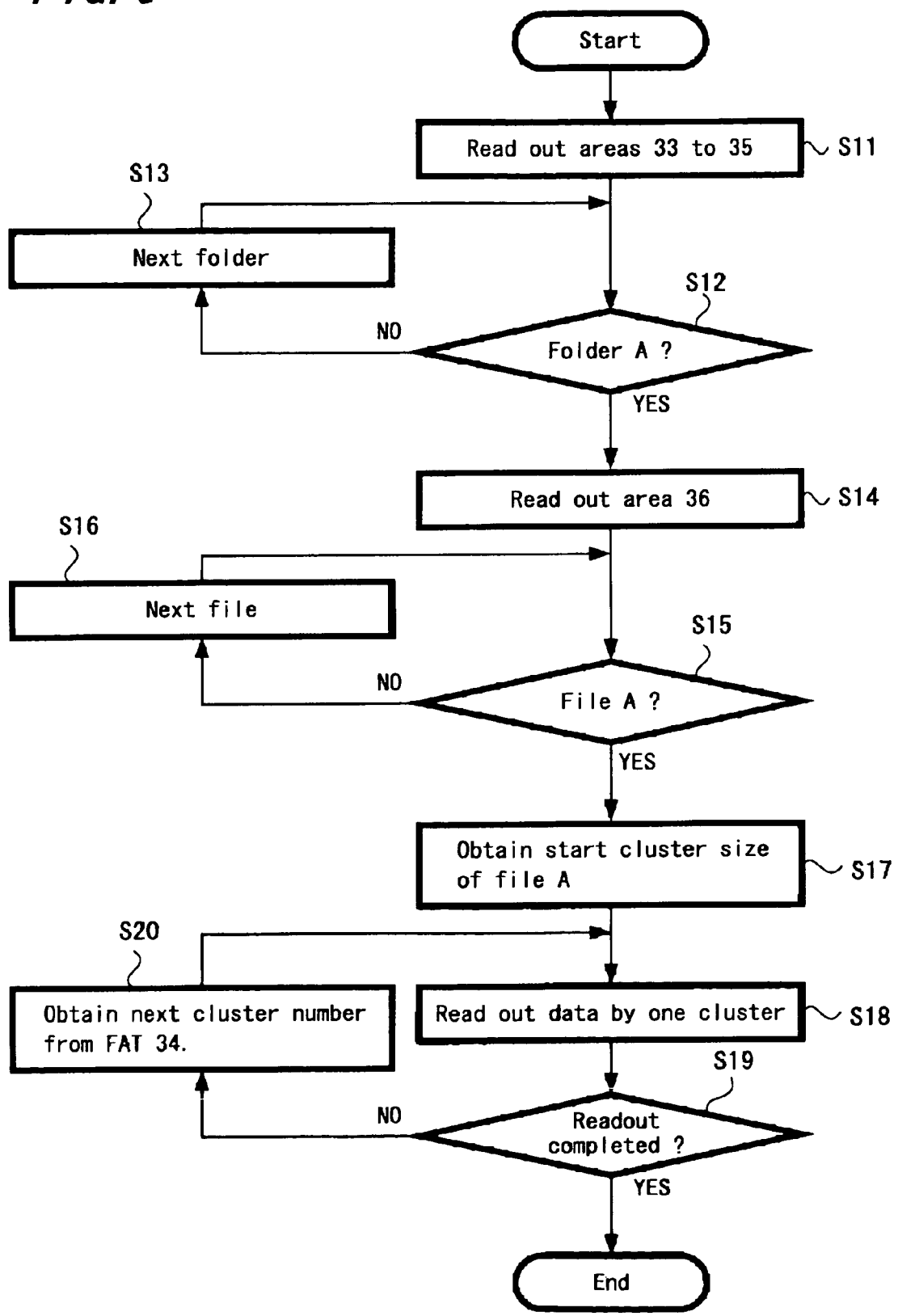
FIG. 6 is a flow chart showing reproduction processing of data from the memory stick of FIG. 1 using the FAT file system.

Next, the case where data is reproduced from the memory stick 1 by the FAT file system is explained. FIG. 6 is a flow chart showing the reproduction processing of data from the memory stick 1 by using the FAT file system. In this processing, at first, the memory stick 1 is recognized as the memory stick formatted by the FAT file system, by reading out the boot area 33, FAT 34 and root directory 35 in the data area 30 (step S11).

Next, the judgment of whether or not the information on the folder to be read out (folder "A" of FIG. 3 in this case) was read out is repeated while reading out information with respect to the folder from the root directory 35 one by one (steps S12 and S13).

When it becomes "YES", the accesses to the folder area 36 is executed, and the judgment of whether or not the information on the folder to be read out (folder "A" of FIG. 3 in this case) was read out is repeated while reading out the information with respect to each of files "A" to "E" from the folder area 36 one by one (steps S14, S15, and S16).

When it becomes "YES", the start sector and size information on the file "A" is acquired (step S17), and data by one cluster is read out based on the acquired cluster information (step 18). Then, it is judged whether or not the readout of the file "A" was completed based on the acquired cluster size information (step S19).

If it becomes "NO", the judgment of the steps S18 and S19 is repeated after acquiring from the FAT 34 information on the next cluster number with respect to the file "A" one by one (step S20). Then, the processing ends when it becomes "YES".

As described above, data can also be reproduced from the memory stick 1 by the FAT file system. However, data reproduced by the FAT file is the data in which the arrangement of the data (audio data of the original questions of the examination) is changed within the dedicated data area 31, because the start cluster and following clusters in the folder are appropriately positioned within the dedicated data area 31 or dedicated file system management area 32 regardless of the data array of the files from 31 (1) to 31 (N) within the dedicated data area 31, as described above.

Therefore, even if data is reproduced from this memory card 1 by using a system in general in which the OS such as Windows® or the like is installed, the original data may not be leaked, because the data is recognized as the random audio data different from the audio data of the questions of the examination.

Figure 7:
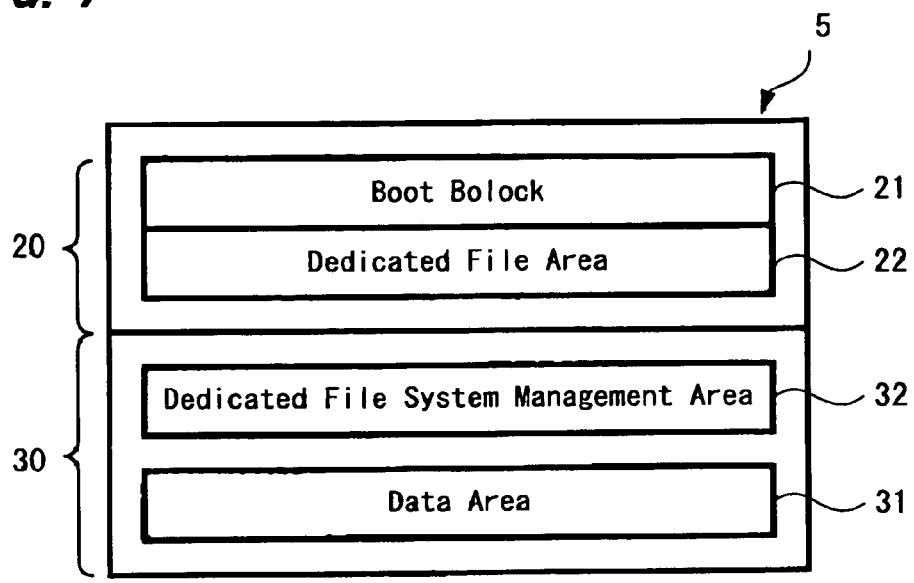
FIG. 7 is a diagram showing the format of a flash memory in the case where the FAT file system management area is not provided.
Figure 8:
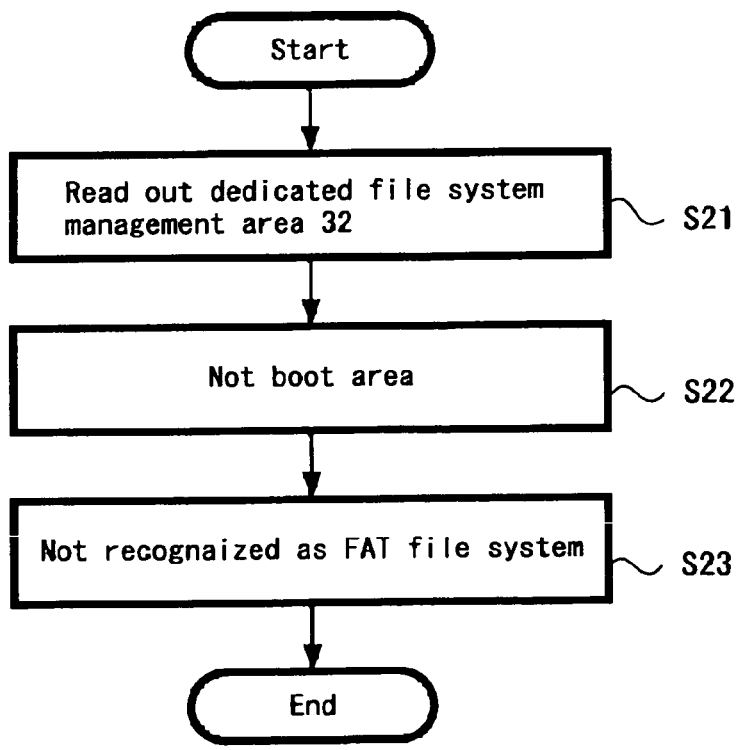
FIG. 8 is a flow chart showing the data reproduction processing using the FAT file system in the case of the format of FIG. 7.

Further, the FAT file system management area such as the boot area 33, FAT 34, root directory and folder area are provided in the data area 30 in the memory stick 1 in the above; on the other hand, in the case where such FAT file system management area is not provided in the data area 30 as shown in FIG. 7 (only the dedicated data area 31 and dedicated file system management area 32 are provided in the data area 30), the reproduction processing of the data by the FAT file system becomes as shown in FIG. 8.

In this processing, at first, the dedicated data area 31 or the dedicated file system management area 32 within the data area are read out (step S21), however since the area is not the boot area (step 22), the memory stick is not recognized as the one formatted by the FAT file system (step S23), consequently the processing ends.

However, when a memory stick is not recognized as the memory stick formatted by the FAT file system, the possibility of data with high confidentiality being stored by a dedicated manner might be suggested.

On the contrary, with respect to the memory stick 1 according to an embodiment of the present invention, questions of the examination are stored in the memory stick with the data format only reproducible by the dedicated file system having no compatibility with the FAT file system, and in addition to that, the memory stick can also be recognized as the memory stick formatted by the FAT file system. Accordingly, the questions of the examination can be stored in the existing memory stick that uses the FAT file system, with a data format having no compatibility with the FAT file system. Consequently, data with high confidentiality such as questions of the examination can be stored safely in the memory stick while maintaining the function of the FAT file system that the existing memory stick has.

Further, because the data reproduced by the FAT file system is the data whose data array is altered from that of the data within the dedicated data area 31, the data reproduced by the FAT file system can be the data different from the data reproduced by the dedicated file system, without adding an area where the data is stored, except for the dedicated data area 31.

Further, in this memory stick 1, the dedicated file area 22 that indicates an access method to the dedicated file system management area 32 is provided in the system area 20 of the flash memory 42, as shown in FIG. 3.

Accordingly, even if the data reproduced from the data area 30 of the flash memory 42 in the memory stick 1 by the FAT file system was illegally copied to another memory stick and questions of the examination are tried to be reproduced from another memory stick by the player 11, the dedicated file system management area 32 is not able to be accessed because the dedicated file area 22 is not included; consequently the questions of the examination can not be reproduced by accessing the dedicated data area 31. Therefore, questions of the examination can be stored safely from this viewpoint, because the illegal copy of this memory stick 1 can be prevented.

In addition, in the above described example, it is further preferable to store audio data of questions of the examination into the dedicated data area 31 of the flash memory 42 after performing the encryption processing. With that, the questions of the examination can be stored more safely.

Furthermore, in the above described example, data whose arrangement is changed from the data reproduced from the dedicated data area 31 based on information within the dedicated file system management area 32 is reproduced on the basis of the information within the FAT file system management areas 33 to 36. However, by means of other modes than that, data reproduced based on information within the FAT file system management areas 33 to 36 and data reproduced from the dedicated data area 31 based on information within the dedicated file system management area 32 are made to be different data (for example, the other data stored in an area except for the dedicated data area 31 is reproduced based on the information within the FAT file system management areas 33 to 36).

Moreover, in the above described examples, the present invention is applied to the memory stick that stores questions of the examination (audio data) and the dedicated player that reproduces the questions of the examination from this memory stick. However, not limited thereto; in the memory stick may be stored other data with high confidentiality than questions of the examination (for example, personal information such as an address, name, mail address, credit card number and the like) and the data may be reproduced (displayed on screen) using a dedicated player.

Furthermore, although the present invention is applied to the memory stick in the above described examples, the present invention may be applied to memory cards other than the memory stick, such as the smart media™ and compact flash®.

It should be understood by those skilled in the art that various modifications, combinations, sub-combinations and alterations may occur depending on design requirements and other factors insofar as they are within the scope of the appended claims or the equivalents thereof.

What is claimed is:

1. A memory card comprising at least a semiconductor memory and an external interface for accessing the memory, a data area of the semiconductor memory comprising:
   an externally accessible FAT file system management area;
   an externally accessible dedicated data area that stores data accessible by a dedicated file system and the FAT file system, wherein the dedicated file system is different from the FAT file system; and
   a dedicated file system management area that indicates an access method to access the dedicated data area according to said dedicated file system,
   wherein data reproduced from said dedicated data area based on information within said FAT file system management area is different from data reproduced from said dedicated data area based on information within said dedicated file system management area.

2. The memory card according to claim 1, wherein the data reproduced from said dedicated data area based on the information within said FAT file system management area is data whose data array is altered from that of the data reproduced from said data area based on the information within said dedicated file system management area.

3. The memory card according to claim 1, further comprising, in a system area of said semiconductor memory separate from said dedicated data area, a dedicated file area that indicates an access method to the dedicated file system management area.

4. A reproducing apparatus which reproduces data from a memory card: the memory card including in a data area of a semiconductor memory, a FAT file system management area, a dedicated data area that stores data externally accessible by a dedicated file system and a FAT file system, wherein the dedicated file system is different from the FAT file system, the semiconductor memory further including a dedicated file system management area that indicates an access method to said dedicated data area via said dedicated file system, and wherein data reproduced based on information within said FAT file system management area is data different from data reproduced from said dedicated data area based on information within said dedicated file system management area, said reproducing apparatus comprising:
   an interface for interfacing with said memory card, and
   processing means that perform first processing of accessing said dedicated file system management area within said data area via a predetermined process known only to the reproducing apparatus; and second processing of accessing said dedicated data area by means of the access method indicated by said dedicated file system management area to reproduce the data.

5. The reproducing apparatus according to claim 4,
   wherein said memory card includes, in a system area of said semiconductor memory separate from said data area, a dedicated file area that indicates an access method to the dedicated file system management area, and
   in said first processing, after accessing said dedicated file area within said system area, said dedicated file system management area within said data area is accessed by means of the access method indicated by said dedicated file area.

6. A reproducing apparatus which reproduces data from a memory card, the memory card including in a data area of a semiconductor memory: a FAT file system management area, a dedicated data area that stores data externally accessible by a dedicated file system and the FAT file system, wherein the dedicated file system is different from the FAT file system, the semiconductor memory further comprising a dedicated file system management area that indicates an access method to said dedicated data area via said dedicated file system, such that data reproduced from said dedicated data area via said FAT file system management area is data different from data reproduced from said dedicated data area via said dedicated file system management area, the reproducing apparatus comprising:
   an interface for interfacing with said memory card, and
   a processing unit that performs first processing of accessing said dedicated file system management area within said data area via a predetermined process known only to the reproducing apparatus; and second processing of accessing said dedicated data area by means of the access method indicated by said dedicated file system management area to reproduce the data.

* * * * *